US008508606B2

(12) United States Patent
Liu

(10) Patent No.: US 8,508,606 B2
(45) Date of Patent: Aug. 13, 2013

(54) SYSTEM AND METHOD FOR DEBLURRING MOTION BLURRED IMAGES

(75) Inventor: Chien-Hung Liu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 936 days.

(21) Appl. No.: 12/622,720

(22) Filed: Nov. 20, 2009

(65) Prior Publication Data

US 2011/0122296 A1 May 26, 2011

(51) Int. Cl.
*H04N 5/228* (2006.01)
*H04N 5/217* (2011.01)

(52) U.S. Cl.
USPC ............... 348/208.6; 348/208.4; 348/241

(58) Field of Classification Search
USPC ......... 348/207.99, 208.99, 208.1, 208.2, 348/208.3, 208.4, 208.5, 208.6, 208.12, 208.13, 348/222.1, 241; 382/254, 255, 263, 264, 382/266, 275
See application file for complete search history.

(56) References Cited

U.S. PATENT DOCUMENTS

| | | | | |
|---|---|---|---|---|
| 5,365,303 A * | 11/1994 | Yamasaki et al. | | 396/53 |
| 7,675,546 B2 * | 3/2010 | Usui | | 348/208.5 |
| 7,711,253 B2 * | 5/2010 | Tomita et al. | | 396/53 |
| 2007/0098292 A1 * | 5/2007 | Batur | | 382/261 |

OTHER PUBLICATIONS

Renting Liu et al.,"Image Partial Blur Detection and Classification", Jun. 28, 2008, Computer Vision and Pattern Recognition, CVPR 2008, IEEE Conference.

* cited by examiner

*Primary Examiner* — Tuan Ho
*Assistant Examiner* — Peter Chon
(74) *Attorney, Agent, or Firm* — Altis Law Group, Inc.

(57) ABSTRACT

An image deblurring system deblurs motion blurred images of a video stream captured from a moving object. An image deblurring method selects a blurred image from the video stream, selects blurred pixels from the blurred image, and calculates a movement offset for each of the blurred pixels according to coordinates of the blurred pixel in a frequency domain during the movement of the moving object. The method generates a point spread function according to the movement offset, and generates an image conversion formula according to the point spread function. The method converts each of the blurred pixels into a sharp pixel according to the image conversion formula, and generates a sharp image based on all of the sharp pixels.

14 Claims, 5 Drawing Sheets

SYSTEM AND METHOD FOR DEBLURRING MOTION BLURRED IMAGES

BACKGROUND

1. Technical Field

Embodiments of the present disclosure relate generally to systems and methods for processing images, and more particularly to a system and method for deblurring motion blurred images.

2. Description of Related Art

Motion blur due to camera shake is a common problem in photography, especially in conditions involving object movement and low light. Pressing a shutter release button on a digital camera can cause the digital camera to shake, and unfortunately cause blurred images. During capturing images for a moving object, either due to the digital camera or object movement, the captured image will exhibit motion blur. However, there is no adequate solution to the problem of motion blur in such digital camera.

Accordingly, there is a need for a adequate system and method for deblurring motion blurred images, so as to deblur the blurred images due to digital camera or object movement.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
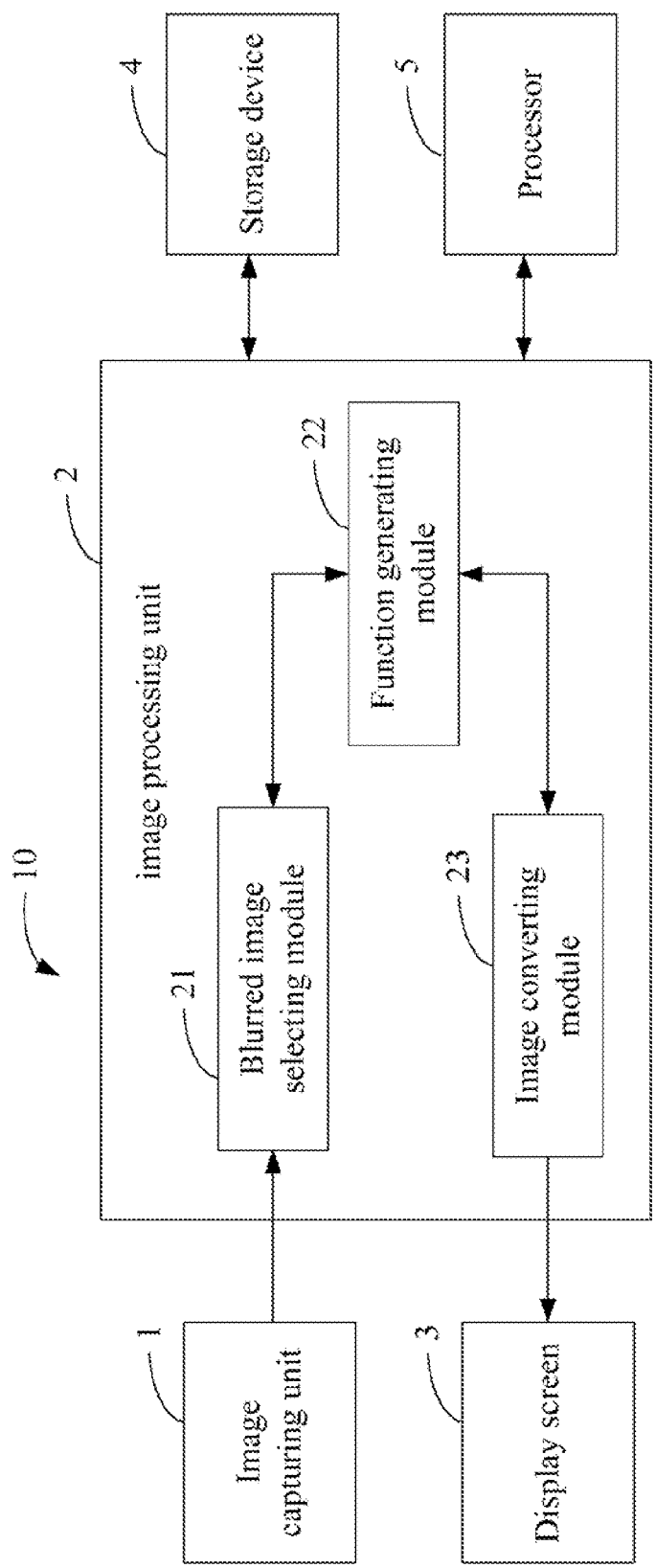
FIG. 1 is a schematic diagram of one embodiment of an image deblurring system.

FIG. 1 is a schematic diagram of one embodiment of an image deblurring system 10 for deblurring motion blurred images. In one embodiment, the image deblurring system 10 may be included in a digital image capturing device, such as a digital camera, a video mobile phone, or a video camera, so as to deblur a motion blurred image during the capture of a video stream of a moving object, for example. In another embodiment, the image deblurring system 10 may be installed in and implemented by a computing system to process blurred images that are stored in a storage system of the computing system, such as a hard disk, or a digital storage system. During the capture of the video stream of the moving object, the digital image capturing device may capture a plurality of motion blurred images either due to the digital image capturing device or the object movement. Additionally, a motion blurred image of the object may be captured when a shutter speed of the digital image capturing device is lower than a moving speed of the object.

In one embodiment, the image deblurring system 10 may include an image capturing unit 1, an image processing unit 2, a display screen 3, a storage device 4, and at least one processor 5. The image capturing unit 1 is operable to capture a video stream of a moving object, and send the video stream to the image processing unit 2. The image processing unit 2 is operable to select a plurality of blurred images from the video stream, deblur each of the burred images to a sharp image correspondingly, and display the sharp image on the display screen 3. The display screen 3 is operable to display the sharp image for user viewing. The storage device 4 may be an internal storage device, such as a random access memory (RAM) for temporary storage of information and/or a read only memory (ROM) for permanent storage of information. The storage device 4 may also be an external storage device, such as a hard disk, a storage card, or a data storage medium. The image capturing unit 1 may include a video camera, for example.

In the embodiment, the image processing unit 2 may include a blurred image selecting module 21, a function generating module 22, and an image converting module 23. One or more computerized codes of the function modules 21-23 may be stored in the storage device 4 and executed by the at least one processor 5. In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. The modules described herein may be implemented as either software and/or hardware modules and may be stored in any type of computer-readable medium or other storage device.

Figure 3:
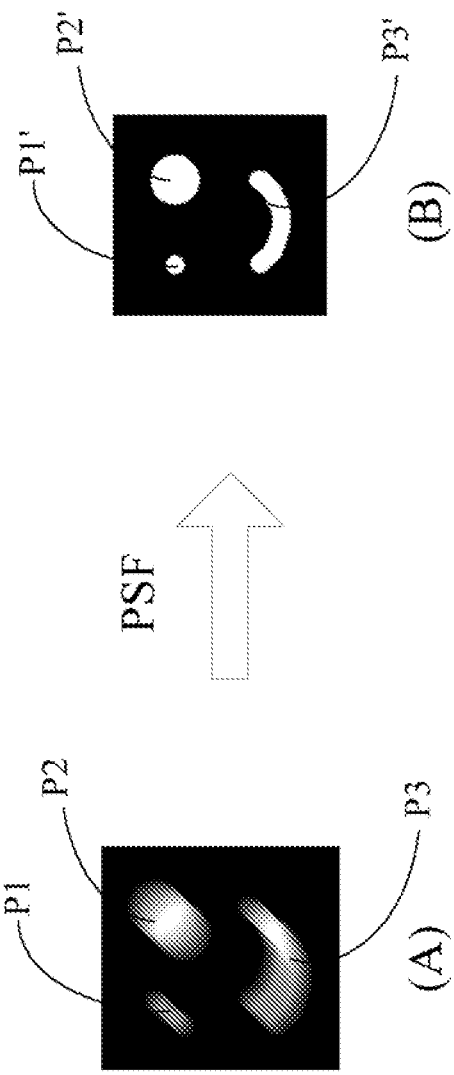
FIG. 3A is a schematic diagram of a blurred image of a moving object.
FIG. 3B is a schematic diagram of a sharp image converted from the blurred image.

The blurred image selecting module 21 is operable to select a blurred image from the video stream of the moving object captured by the image capturing unit 1, and select a plurality of blurred pixels from the selected blurred image. In one embodiment, the blurred image selecting module 21 selects a digital image of the video stream as a blurred image when a shutter release speed of the image capturing unit 1 is lower than a moving speed of the moving object. In one example, with respect to FIG. 3, the digital image A is very vague (e.g., is blurred), and is selected as a blurred image by the blurred image selecting module 21. In one example, the blurred image selecting module 21 may select the blurred pixels, such as $P_1$, $P_2$, and $P_3$, from the blurred image A.

The function generating module 22 is operable to calculate a movement offset for each of the blurred pixels according to coordinates of the blurred pixel in a frequency domain during the movement of the moving object, and generate a point spread function (PSF) according to the movement offset. In one embodiment, the movement offset may include a movement distance (denoted as "d") of the moving object, and a movement angle (denoted as "θ") of the moving object. The point spread function can be denoted as: PSF=F(v, w)=f(d, θ), where v and w are coordinates of the blurred pixel in the frequency domain, F(v, w) represents a first function relationship between v and w, and f(d, θ) represents a second function relationship between d and θ. In one example with respect to FIG. 4, it is assumed that the coordinates of a blurred pixel $P_2$ in the frequency domain are denoted as $(v_2, w_2)$, where $w_2=v_2*Tg\theta$, here the "Tgθ" represents a tangent value of the movement angle θ. Referring to FIG. 5, the movement distance of the moving object can be denoted as $d=P_2^{n+1}-P_2^n$, where n represents a number of the blurred image during the movement of the moving object.

The image converting module 23 is operable to generate an image conversion formula according to the point spread function, and convert each of the blurred pixels into a sharp pixel according to the image conversion formula. The image converting module 23 is further operable to generate a sharp image based on all of the sharp pixels, and display the sharp image on the display screen 3. In one example with respect to FIG. 3, the sharp image (e.g. the sharp image B) is clear and better than the blurred image (i.e., the blurred image A). The sharp image B may include a plurality of sharp pixels, such as $P_1'$, $P_2'$ and $P_3'$. In one embodiment, the image conversion formula is denoted as $Y(v, w)=X(v, w)*1/F(v, w)+N$. In the image conversion formula, $Y(v, w)$ is a representation of a sharp image, such as the sharp image B in FIG. 3, for example. Additionally, $X(v, w)$ is a representation of a blurred image, such as the blurred image A in FIG. 3, for example. Furthermore, $F(v, w)$ is the point spread function of a blurred pixel of the blurred image, and N represents a noise ratio of the blurred image. In one example with respect to FIG. 4, it is assumed that the blurred pixel $P_2$ of the blurred image A corresponds to the sharp pixel $P_2'$ of the sharp image B. The image converting module 23 calculates the sharp pixel $P_2'$ according to the image conversion formula as follows: $P_2'(v_2', W_2')=P_2(v_2, w_2)1/F(v_2, w_2)+N$, where $P_2'(V_2', w_2')$ is a representation of coordinates of the sharp pixel $P_2'$ of the sharp image B in the frequency domain, $P_2(v_2, w_2)$ is a representation of coordinates of the blurred pixel $P_2$ of the blurred image A in the frequency domain, $F(v_2, w_2)$ represents the point spread function of the blurred pixel $P_2$, and N represents a noise ratio of the blurred image A.

Figure 2:
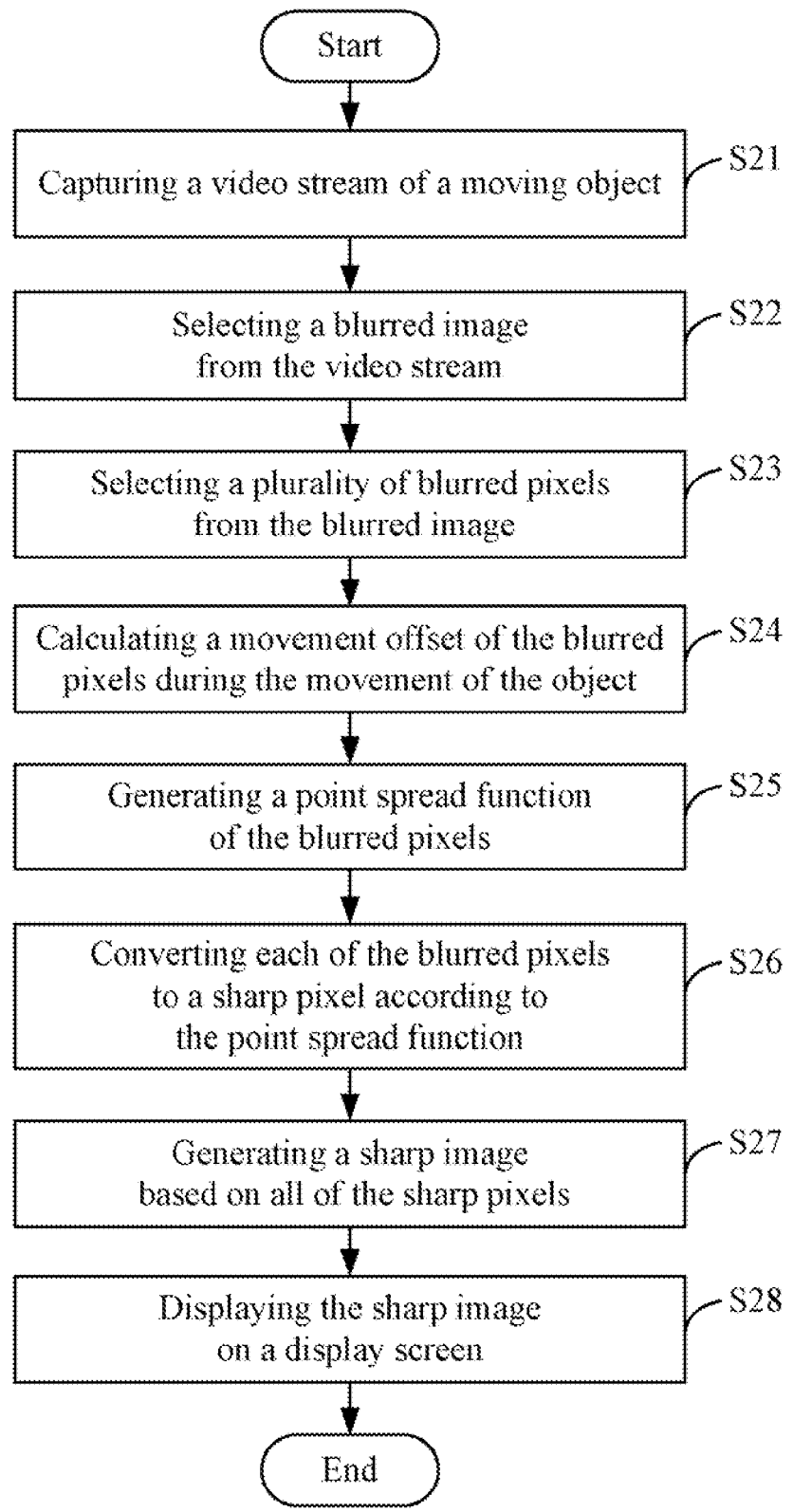
FIG. 2 is a flowchart of one embodiment of a method for deblurring motion blurred images by the image deblurring system as described in FIG. 1.

FIG. 2 is a flowchart of one embodiment of a method for deblurring motion blurred images by the image deblurring system 10 as described in FIG. 1. Depending on the embodiment, additional blocks may be added, others removed, and the ordering of the blocks may be changed.

In block S21, the image capturing unit 1 captures a video stream from a moving object, and sends the video stream to the image processing unit 2. In one embodiment, the image processing unit 2 includes a blurred image selecting module 21, a function generating module 22, and an image converting module 23.

In block S22, the blurred image selecting module 21 selects a blurred image from the video stream of the moving object captured by the image capturing unit 1. In one embodiment, the blurred image selecting module 21 selects a digital image of the video stream as a blurred image when a shutter release speed of the image capturing unit 1 is lower than a moving speed of the moving object. In one example with respect to FIG. 3, the digital image A is very vague (e.g., is blurred), and is selected as a blurred image by the blurred image selecting module 21.

In block S23, the blurred image selecting module 21 selects a plurality of blurred pixels from the blurred image. In one example with respect to FIG. 3, the blurred image selecting module 21 selects the blurred pixels, such as $P_1$, $P_2$, and $P_3$, from the blurred image A.

In block S24, the function generating module 22 calculates a movement offset for each of the blurred pixels according to coordinates of the blurred pixel in a frequency domain during the movement of the moving object. In block S25, the function generating module 22 generates a point spread function (PSF) according to the movement offset. In one embodiment, the movement offset may include a movement distance (denoted as "d") of the moving object, and a movement angle (denoted as "θ") of the moving object. The point spread function can be denoted as: $PSF=F(v, w)=f(d, \theta)$, where v and w are coordinates of the blurred pixel in the frequency domain, $F(v, w)$ represents a first function relationship between v and w, and $f(d, \theta)$ represents a second function relationship between d and θ. In one example with respect to FIG. 4, it is assumed that the coordinates of a blurred pixel $P_2$ in the frequency domain are denoted as $(v_2, w_2)$, where $w_2=v_2*Tg\theta$, here the "Tgθ" represents a tangent value of the movement angle θ. Referring to FIG. 5, the movement distance of the moving object can be denoted as $d=P_2^{n+1}-P_2^n$, where n represents a number of the blurred image during the movement of the moving object.

In block S26, the image converting module 23 generates an image conversion formula according to the point spread function, and converts each of the blurred pixels into a sharp pixel according to the image conversion formula. In one embodiment, the image conversion formula is denoted as $Y(v, w)=X(v, w)*1/F(v, w)+N$. Where $Y(v, w)$ is a representation of a sharp image, such as the sharp image B in FIG. 3, for example. $X(v, w)$ is a representation of a blurred image, such as the blurred image A in FIG. 3, for example. $F(v, w)$ is the point spread function of a blurred pixel of the blurred image, and N represents a noise ratio of the blurred image. In one example with respect to FIG. 4, it is assumed that the blurred pixel $P_2$ of the blurred image A corresponds to the sharp pixel $P_2'$ of the sharp image B. The image converting module 23 calculates the sharp pixel $P_2'$ according to the image conversion formula as follows: $P_2'(v_2', w_2')=P_2(v_2, w_2)\times 1/F(v_2, w_2)+N$. In the image conversion formula, $P_2'(V_2', w_2)$ is a representation of coordinates of the sharp pixel $P_2'$ of the sharp image B in the frequency domain. Additionally, $P_2(v_2, w_2)$ is a representation of coordinates of the blurred pixel $P_2$ of the blurred image A in the frequency domain. Furthermore, $F(v_2, w_2)$ represents the point spread function of the blurred pixel $P_2$, and N represents a noise ratio of the blurred image A.

Figure 4:
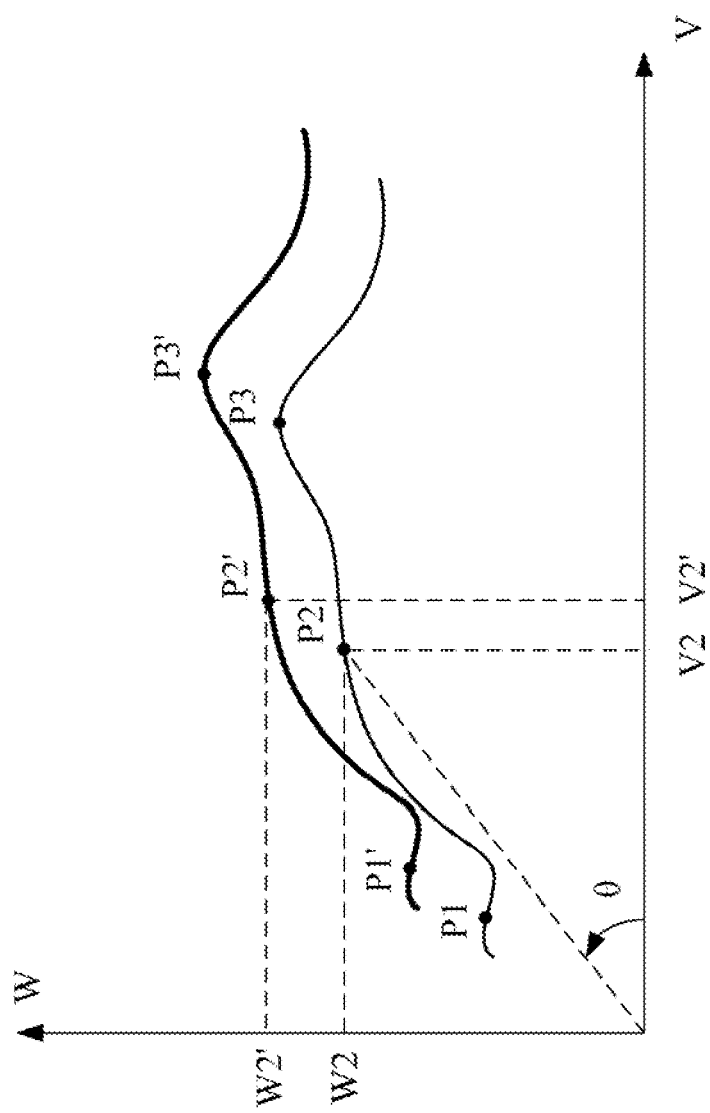
FIG. 4 is a schematic diagram illustrating a frequency spectrum of pixels in a blurred image and a sharp image.
Figure 5:
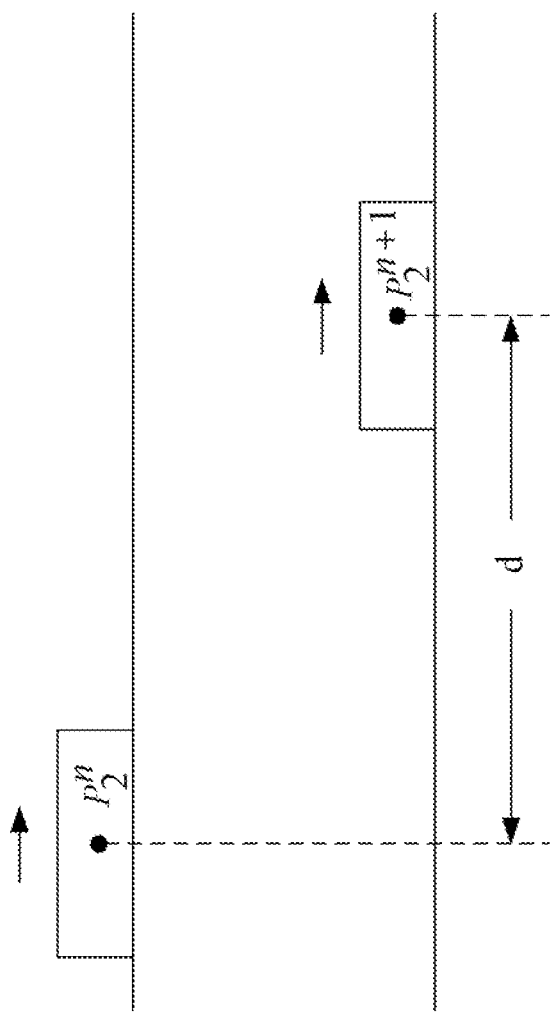
FIG. 5 is a schematic diagram illustrating a movement distance of a moving object.

In block S27, the image converting module 23 generates a sharp image (e.g., the sharp image B in FIG. 3) based on all of the sharp pixels, such as $P_1'$ $P_2'$ and $P_3'$ in FIG. 4, for example. In block S28, the image converting module 23 displays the sharp image on the display screen 3.

All of the processes described above may be embodied in, and fully automated via, functional code modules executed by one or more general purpose processors of digital image capturing devices. The functional code modules may be stored in any type of readable medium or other storage devices. Some or all of the methods may alternatively be embodied in specialized the image capturing devices.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for deblurring a motion blurred image of a video stream, the system comprising:
   an image capturing unit operable to capture a video stream of a moving object;
   a display screen operable to display the video stream; and
   an image processing unit, comprising:
   a blurred image selecting module operable to select a blurred image from the video stream, and select a plurality of blurred pixels from the blurred image;
   a function generating module operable to calculate a movement offset for each of the blurred pixels according to coordinates of the blurred pixel in a frequency domain during the movement of the moving object, and generate a point spread function (PSF) according to the movement offset; and
   an image converting module operable to generate an image conversion formula according to the point spread function, convert each of the blurred pixels into a sharp pixel according to the image conversion formula, generate a sharp image based on all of the sharp pixels, and display the sharp image on the display screen;
wherein the image conversion formula is denoted as $Y(v, w)=X(v, w)*1/F(v, w)+N$, where $Y(v, w)$ is a representation of the sharp image, $X(v, w)$ is a representation of the blurred image, $F(v, w)$ represents a first function relationship between v and w, and N represents a noise ratio of the blurred image, v and w are coordinates in the frequency domain of a blurred pixel of the blurred image.

2. The system according to claim 1, wherein the blurred image selecting module selects the blurred image when a shutter release speed of the image capturing unit is lower than a moving speed of the moving object.

3. The system according to claim 1, wherein the movement offset comprises a movement distance and a movement angle of the moving object.

4. The system according to claim 3, wherein the point spread function is denoted as $PSF=F(v, w)=f(d, \theta)$, where v and w are coordinates in the frequency domain of a blurred pixel of the blurred image, d is the movement distance of the moving object, $\theta$ is the movement angle of the moving object, and $f(d, \theta)$ represents a second function relationship between d and $\theta$.

5. The system according to claim 1, wherein the image processing unit is included in a digital image capturing device to deblur motion blurred images during the capture of the video stream of the moving object.

6. The system according to claim 1, wherein the image processing unit is included in a computing system to process motion blurred images that are stored in a storage system.

7. A method for deblurring a motion blurred image of a video stream, the method comprising:
    capturing a video stream of a moving object via an image capturing unit;
    selecting a blurred image from the video stream, and selecting a plurality of blurred pixels from the blurred image;
    calculating a movement offset for each of the blurred pixels according to coordinates of the blurred pixel in a frequency domain during the movement of the moving object;
    generating a point spread function (PSF) according to the movement offset;
    generating an image conversion formula according to the point spread function;
    converting each of the blurred pixels into a sharp pixel according to the image conversion formula;
    generating a sharp image based on all of the sharp pixels; and
    displaying the sharp image on a display screen;
    wherein the image conversion formula is denoted as $Y(v, w)=X(v, w)*1/F(v, w)+N$, where $Y(v, w)$ is a representation of the sharp image, $X(v, w)$ is a representation of the blurred image, $F(v, w)$ represents a first function relationship between v and w, and N represents a noise ratio of the blurred image, v and w are coordinates in the frequency domain of a blurred pixel of the blurred image.

8. The method according to claim 7, wherein the blurred image is selected from the video stream when a shutter release speed of the image capturing unit is lower than a moving speed of the moving object.

9. The method according to claim 7, wherein the movement offset comprises a movement distance and a movement angle of the moving object.

10. The method according to claim 9, wherein the point spread function is denoted as $PSF=F(v, w)=f(d, \theta)$, where v and w are coordinates of a blurred pixel of the blurred image in the frequency domain, d is the movement distance of the moving object, $\theta$ is the movement angle of the moving object, and $f(d, \theta)$ represents a second function relationship between d and $\theta$.

11. A non-transitory computer-readable storage medium having stored thereon instructions that, when executed by a processor of a digital image capturing device, cause the digital image capturing device to perform a method for deblurring a motion blurred image of a video stream, the method comprising:
    capturing a video stream of a moving object via an image capturing unit of the digital image capturing device;
    selecting a plurality of blurred images from the digital images, and selecting a plurality of blurred pixels from the each of the blurred images;
    calculating a movement offset for each of the blurred pixels according to coordinates of the blurred pixel in a frequency domain during the movement of the moving object;
    generating a point spread function (PSF) according to the movement offset;
    generating an image conversion formula according to the point spread function;
    converting each of the blurred pixels into a sharp pixel according to the image conversion formula;
    generating a sharp image based on all of the sharp pixels; and
    displaying the sharp image on a display screen of the digital image capturing device;
    wherein the image conversion formula is denoted as $Y(v, w)=X(v, w)*1/F(v, w)+N$, where $Y(v, w)$ is a representation of the sharp image, $X(v, w)$ is a representation of the blurred image, $F(v, w)$ represents a first function relationship between v and w, and N represents a noise ratio of the blurred image, v and w are coordinates in the frequency domain of a blurred pixel of the blurred image.

12. The non-transitory computer-readable storage medium according to claim 11, wherein the blurred image is selected from the video stream when a shutter release speed of the image capturing unit is lower than a moving speed of the moving object.

13. The non-transitory computer-readable storage medium according to claim 11, wherein the movement offset comprises a movement distance and a movement angle of the moving object.

14. The non-transitory computer-readable storage medium according to claim 13, wherein the point spread function is denoted as $PSF=F(v, w)=f(d, \theta)$, where v and w are coordinates of a blurred pixel of the blurred image in the frequency domain, d is the movement distance of the moving object, $\theta$ is the movement angle of the moving object, and $f(d, \theta)$ represents a second function relationship between d and $\theta$.

* * * * *